3,558,526
CEMENT MATRIX RADIATION SHIELDING COMPOSITIONS CONTAINING CALCIUM COMPOUNDS
William Cornelius Hall, Albany Turnpike, Central Valley, N.Y. 10917, and John Merriam Peterson, Foleman Road, Rock Tavern, N.Y. 12575
No Drawing. Filed Aug. 1, 1967, Ser. No. 657,494
Int. Cl. C04b 35/68
U.S. Cl. 252—478                      6 Claims

ABSTRACT OF THE DISCLOSURE

A radiation shielding composition consisting essentially of a material selected from the group consisting of calcium carbonate, calcium oxide, calcium hydroxide, and mixtures thereof uniformly dispersed throughout a cement matrix.

---

The present invention relates to a novel radiation shielding composition. More particularly, the invention relates to a dry flowable composition which, on admixture with water, can be utilized to fabricate a radiation shield having desirable properties.

In this nuclear age, the problem of shielding personnel from radiation, particularly direct radiation from such newly-developed devices as nuclear reactors and accelerators, has received widespread attention. In general, however, all efforts have been directed toward the quest of materials capable of attenuating and capturing various forms of direct radiation, which materials could be placed in the form of a suitable shield between the source of radiation and the operating personnel, thus reducing or eliminating radiation hazards to the latter. Lead, water, high density concrete, and the like, are exemplary of such materials.

Another problem which has not received quite the same amount of attention is the radiation hazard to personnel entering the reactor or accelerator tunnel after the primary source of radiation has been removed or inactivated. Said hazard is due to the activation of certain elements present on and in the proximity of the interior surface of the bulk shield to a radioactive form as a result of exposure to the primary high energy radiation source. For example, sodium, which is present as an impurity in many materials used for primary shielding, or which is formed as a result of spallation of higher Z materials used in said shielding, is activated to radioactive Na-24 upon exposure to a high energy proton flux, such as normally produced during the operation of various types of accelerators.

The most common method of dealing with this problem is to allow a time period for the apparatus to "cool-off" after shut-down until the radiation background in the interior thereof is considerably reduced. Such method has considerable drawbacks. While, in general, the half life of radioisotopes resulting from said activation is relatively short, nevertheless such "cooling-off" periods result in substantial down time, unavailability of equipment, improper utilization of personnel, and the like. By way of example, it may be mentioned that Na-24, which is obtained in substantial amounts when a bulk shielding material such as concrete is exposed to a high energy proton flux, has a half life of about 15 hours, and thus causes "cooling-off" periods of substantial duration everytime the apparatus is shut-down.

Another method of dealing with this problem has been to line the interior walls of the apparatus with a shielding material which, once the apparatus was shut down, would effectively protect personnel entering the apparatus after shut down against radiation resulting from activation of the bulk shielding. However, materials heretofore proposed for this use possess one or more disadvantages, such as, for example, high cost, difficulty of application, moderate efficiencies, and the like.

It is an object of the invention to provide novel radiation shielding compositions. It is another object of the invention to provide radiation shielding compositions which are particularly useful for lining interior walls and ceilings which are exposed to high energy radiation. It is a further object to provide radiation shielding compositions which are free of one or more disadvantages of prior art materials. These and other objects will in part be obvious and in part become apparent to those skilled in the art in the light of the instant specification and appended claims.

Ideally, a material which can be used to line interior surfaces which are exposed to high energy radiation during operation of the apparatus should possess the following desirable properties:

(1) It should be relatively inexpensive.
(2) It should be easy to apply, at minimum labor cost.
(3) It should possess high structural strength.
(4) It should not break down structurally on exposure to high energy radiation.
(5) It should not become activated during such exposure.
(6) It should be in a form which is convenient to transport to the desired location.
(7) It should be effective in attenuating radiation from the activated surfaces.

It has unexpectedly been found that compositions consisting essentially of a calcium compound selected from the group consisting of calcium carbonate, calcium oxide, calcium hydroxide, and mixtures thereof, uniformly dispersed through an inorganic cement matrix, are eminently suitable for the intended purposes.

Such compositions can be transported in a dry flowable particulate form to the desired location, where they are mixed with a suitable amount of water, applied by suitable methods, conventional for standard mortars such as spraying, pouring, plastering or precasting and allowed to cure for a suitable period of time.

As will become apparent hereinafter from the detailed description of the materials suitable for use in the present compositions, said compositions are relatively inexpensive. As will also be shown hereinafter, the compositions of the invention, when mixed with water and allowed to cure, have good structural properties.

The calcium compounds useful in the present invention can, of course, be calcium carbonate, oxide and hydroxide of high chemical purity. However, for the sake of convenience and economy, naturally occurring and readily available commercial forms of such compounds are preferably used, such as, for example, limestone, lime and hydrated lime.

Such compounds are usually used as finely-divided flowable comminuted material which passes through a size 40 mesh. In certain cases, however, particularly where a cured composition of slightly higher density is required, the calcium compound can be added in the form of coarse aggregates, such as marble chips or limestone aggregates, which are essentially pure calcium carbonate, which aggregates are uniformly dispersed through the inorganic cement matrix.

It is desirable, for the purpose of the invention, that the calcium compounds used be as pure as possible, within cost limitations, and preferably, contain no more than traces of sodium compounds and of compounds of other elements having atomic numbers higher than 20, such as iron oxide.

Typical commercial calcium compounds are, for example, a good grade limestone, which contains a minimum of 97.5% calcium carbonate and is very low in impurities; oyster shell, which is essentially all calcium carbonate, with low impurities; a good grade lime, which contains about 97.9% calcium oxide and is also very low in impurities; a high grade hydrated lime which has about 98.2% calcium hydroxide content.

The approximate analysis of a good grade limestone, which is useful in the practice of the present invention, is as follows:

Chemical composition

| | Percent |
|---|---|
| $CaCO_3$ | 97 |
| $MgCO_3$ | 1.5 |
| $SiO_2$ | 2.5 |
| $Al_2O_3$ | 0.4 |
| $Fe_2O_3$ | 0.05 |
| Moisture | >0.3 |

Physical properties

| | |
|---|---|
| Specific gravity | 2.71 |
| Bulk density, lb./cu. ft. | 60–70 |

Sieve analysis

| | Percent |
|---|---|
| Through 200 mesh | 99.9 |
| Through 325 mesh | 99 |

A good grade lime has approximately the following composition:

| | Percent |
|---|---|
| CaO | 97.9 |
| $SiO_2$ | 0.43 |
| $Al_2O_3 + Fe_2O_3$ | 0.45 |
| MgO | 0.52 |

The inorganic cement which is used as the matrix and, ultimately, as the binder in the practice of the present invention should preferably have as high a calcium content as possible and contain minimum amounts of sodium compounds and of compounds of elements having atomic numbers higher than 20. A cement containing calcium, calculated as CaO, in an amount in excess of about 64.5% by weight, sodium compounds in an amount of less than about 0.5% by weight, and compounds of higher Z elements, calculated as the oxides, in an amount of less than about 2.5% by weight.

A commercially available cement which is eminently suited for use in the present invention is that which is produced from pure calcite limestone. Such cement is commonly known as "white cement" due to its low iron oxide content, iron oxide being the component which imparts the characteristic greyish color to standard cements.

A typical analysis of white cement is as follows:

| | Percent |
|---|---|
| CaO | 65 |
| $SiO_2$ | 25.5 |
| $Al_2O_3$ | 5.9 |
| $Fe_2O_3$ | 0.6 |
| MgO | 1.1 |
| $SO_3$ | 0.1 |

In preparing the compositions of the present invention, the two dry flowable components are intimately admixed with each other by standard mechanical means. When needed for use, said compositions are mixed with water to the desired consistency, and sprayed, poured, plastered or precast in conventional manner.

The proportions of calcium compounds to cement in the present compositions, as well as the proportions of the particular calcium compounds in relation to each other if a mixture thereof is used, are not narrowly critical and can be varied within reasonably wide ranges. Said proportions are usually determinant of the properties of the cured material and, therefore, can be selected accordingly. For example, lower activation is obtained by increasing the proportion of the calcium compound whereas higher structural strengths are obtained when the cement content is increased. In general, a ratio of one to six parts by volume of the calcium compound or compounds per part of cement is preferred.

The physical properties of the cured products obtained from various compositions of the invention were determined. Samples were prepared, using high grades of cement, limestone and lime, by thoroughly mixing the finely ground dry materials in the indicated proportions, on a volume basis, and then adding sufficient water to form a stiff mortar, comparable to a regular portland concrete mixture. The mortars were cast into 2 inch diameter cylinders, 4 inches long, for compressive strength and density determinations. The standard mold with a one square inch neck was used for tensile strength tests. Measurements were made on standard Tinius-Olsen laboratory test machines. Cure time was about 60 days at approximately 70° F. Test results are shown in Table 1, which follows:

TABLE 1.—COMPARISON OF PHYSICAL PROPERTIES OF CURED MORTARS

| Sample No. | Composition, dry basis | | | Density, g./cc. | Strength, p.s.i. | |
|---|---|---|---|---|---|---|
| | Cement | Limestone | Lime | | Compressive | Tensile |
| 1 | 1 | 1 | 0 | 2.07 | 12,660 | 400 |
| 2 | 1 | 2 | 0 | 2.03 | 6,000 | 287 |
| 3 | 1 | 3 | 0 | 1.92 | 3,270 | 116 |
| 4 | 1 | 0 | 1 | 1.67 | 5,270 | 151 |
| 5 | 1 | 0 | 2 | 1.45 | 2,850 | 83 |
| 6 | 2 | 0 | 1 | 1.81 | 6,800 | 169 |
| 7 | 1 | 1 | 1 | 1.90 | 7,100 | 181 |
| 8 | 1 | 1 | 2 | 1.69 | 3,580 | 120 |
| 9 | 1 | 2 | 1 | 1.98 | 6,470 | 196 |
| 10 | 2 | 1 | 1 | 1.93 | 10,400 | 237 |

For general comparative purposes, commercial structural concretes are formulated to give compressive strengths between 2000 and 5000 pounds per square inch. The tensile strengths are only a fraction of the compressive strengths, usually about one-tenth. As is apparent from the above results, the cured compositions of the invention compare favorably in structural strengths with commercial structural concretes.

It is also apparent that compositions which contain limestone as the calcium compound have significantly higher structural strengths, and higher densities, than compositions which contain lime. On the otherh and, the lime mixture has an advantage for many shielding purposes because of its appreciably higher calcium content and higher hydrogen content, the latter also contributing appreciably to shielding efficiency of the material. Therefore, as indicated hereinbefore, the composition of mixture can be varied over a considerable range to meet the specifications and needs of the individual radiation shielding requirement.

A sample of material of the present invention, consisting of two parts of finely-ground limestone and one part of white cement, in dry powder form, was irradiated with a pure 600 mev. protons beam, $10^{10}$ protons/$cm.^2$-sec., for a period of four hours. It was found that the gamma activation of the sample, measured through various energy ranges, was found to average slightly more than half as much as that from a dry cement-sand mixture and only about one third as much as aluminum, which were similarly irradiated.

It was also found that the shielding effectiveness of said sample is of about the same order as that of solid marble.

While, in general, the main utility of the composition of the present invention is for lining surfaces which are intermittently exposed to high energy radiation, they can also be used in many other applications, particularly in cases where a low background radiation is desired.

As is well known, a background of radiation exists everywhere, originating from the sun, the cosmos, from radioactive isotopes in the earth, and from fall-out and other man-made effects.

The compositions of the invention, due to their shielding efficiency and their low inherent radiation, are highly suitable for the construction of low radiation background rooms. Such rooms are increasingly needed in hospitals and at large nuclear laboratories for the examination of personnel involved in radiation accidents. Low radiation count steel and lead have been commonly used for such facilities but the high cost of these materials, as well as the high cost of labor involved in installing same, have been a considerable economic drawback.

Similar low radiation background facilities are needed in scientific, medical and industrial research laboratories and in educational institutions for the accurate measurement of inherent radiations of materials and biological specimens and of activation by irradiation of said specimens.

The compositions of the invention, due to the low inherent radiation background, moderate cost, and ease and low cost of installation, are eminently suited for the construction of such facilities.

For example, in certain particular applications, it may be desirable to incorporate within the claimed compositions one or more additional known shielding materials, in a comminuted form, to give the cured product certain additional desirable shielding properties.

What we claim is:

1. A radiation shielding composition consisting essentially of calcium compound selected from the group consisting of substantially pure limestone, lime, hydrated lime and mixtures thereof, uniformly dispersed throughout an inorganic cement matrix, said cement containing in excess of 64.5 percent by weight of calcium, less than about 2.5 percent by weight of compounds of elements having atomic numbers higher than 20, and less than about 0.5 percent by weight of sodium compounds, calculated as the oxides thereof, the proportion of calcium compound to cement being from 1 to 1 to 6 to 1 by volume.

2. The composition of claim 1 wherein the calcium compounds are added in the form of finely-divided flowable comminuted materials which pass through a size 40 mesh.

3. The composition of claim 1 wherein the calcium compounds are added in the form of a coarse aggregates.

4. A dry flowable composition adapted to be admixed with water and allowed to set to form a radiation shielding structure of predetermined form, said composition consisting essentially of a calcium compound selected from the group consisting of substantially pure limestone, lime, hydrated lime and mixtures thereof, uniformly dispersed throughout an inorganic cement matrix, said cement containing in excess of 64.5 percent by weight of calcium, less than about 2.5 percent by weight of compounds of elements having atomic numbers higher than 20, and less than about 0.5 percent by weight of sodium compounds, calculated as the oxides thereof, the proportion of calcium compound to cement being from 1 to 1 to 6 to 1 by volume.

5. The composition of claim 4 wherein the calcium compounds are added in the form of finely-divided flowable comminuted materials which pass through a size 40 mesh.

6. The composition of claim 4 wherein the calcium compounds are added in the form of a coarse aggregates.

References Cited

UNITED STATES PATENTS

| | | | |
|---|---|---|---|
| 1,848,934 | 3/1932 | Case | 106—97 |
| 2,572,510 | 10/1951 | Orsini | 106—97 |
| 2,726,339 | 12/1955 | Borst | 252—478X |
| 2,758,033 | 8/1956 | Burney, Jr. et al. | 106—97 |
| 2,772,739 | 12/1956 | Brakel et al. | 106—97X |
| 3,002,843 | 10/1961 | Stocker | 252—478X |
| 3,239,472 | 3/1966 | De Lisle | 252—478 |

OTHER REFERENCES

Lea et al.: The Chemistry of Cement and Concrete, 1956, pp. 461–462.

BENJAMIN K. PADGETT, Primary Examiner

G. G. SOLYST, Assistant Examiner

U.S. Cl. X.R.

106—85, 97, 118; 250—108